United States Patent
Grun et al.

(10) Patent No.: US 8,828,289 B2
(45) Date of Patent: Sep. 9, 2014

(54) FREE-RADICAL-POLYMERISABLE FIXING MORTAR HAVING SILANE ADDITIVES

(75) Inventors: Jurgen Grun, Botzingen (DE); Martin Vogel, Glottertal (DE); Clemens Schmidt, Denzlingen (DE); Christian Schlenk, Denzlingen (DE); Christian Weinelt, Freiburg (DE)

(73) Assignee: fischerwerke GmbH & Co. KG, Waldachtal (DE)

( * ) Notice: Subject to any disclaimer, the term of this patent is extended or adjusted under 35 U.S.C. 154(b) by 115 days.

(21) Appl. No.: 13/515,636

(22) PCT Filed: Nov. 16, 2010

(86) PCT No.: PCT/EP2010/006980
§ 371 (c)(1),
(2), (4) Date: Jun. 13, 2012

(87) PCT Pub. No.: WO2011/072789
PCT Pub. Date: Jun. 23, 2011

(65) Prior Publication Data
US 2012/0247985 A1    Oct. 4, 2012

(30) Foreign Application Priority Data
Dec. 18, 2009 (DE) .......................... 10 2009 059 210

(51) Int. Cl.
*E04B 1/35* (2006.01)
*C04B 26/16* (2006.01)
*C04B 28/06* (2006.01)
*C04B 28/04* (2006.01)
*C04B 26/06* (2006.01)
*C04B 26/32* (2006.01)
*C04B 26/18* (2006.01)
*C04B 26/14* (2006.01)
*C04B 111/00* (2006.01)
*C04B 103/00* (2006.01)

(52) U.S. Cl.
CPC .............. *C04B 26/32* (2013.01); *C04B 26/16* (2013.01); *C04B 28/06* (2013.01); *C04B 28/04* (2013.01); *C04B 2111/00715* (2013.01); *C04B 26/06* (2013.01); *C04B 2103/0047* (2013.01); *C04B 26/18* (2013.01); *C04B 26/42* (2013.01); *C04B 26/14* (2013.01)
USPC .......................................................... 264/35

(58) Field of Classification Search
CPC ........ C08B 24/42; C08B 26/06; C08B 26/14; C08B 26/16; C08B 26/18; C08B 26/32; C08B 28/04; C08B 28/06
See application file for complete search history.

(56) References Cited

U.S. PATENT DOCUMENTS

| | | | | |
|---|---|---|---|---|
| 5,157,072 A * | 10/1992 | Hense et al. | | 524/553 |
| 5,229,438 A * | 7/1993 | Ishida et al. | | 523/428 |
| 5,498,683 A * | 3/1996 | Kim | | 526/320 |
| 5,643,994 A * | 7/1997 | Kish et al. | | 524/533 |
| 5,708,093 A | 1/1998 | Bastelberger et al. | | |
| 7,939,592 B2 | 5/2011 | Weitzel et al. | | |
| 8,153,722 B2 * | 4/2012 | Nagelsdiek et al. | | 524/506 |
| 2006/0135656 A1 | 6/2006 | Briand et al. | | |
| 2007/0066768 A1 * | 3/2007 | Gauthier et al. | | 525/477 |
| 2010/0294676 A1 * | 11/2010 | Grun et al. | | 206/223 |

FOREIGN PATENT DOCUMENTS

| | | |
|---|---|---|
| DE | 28 11 475 A1 | 8/1978 |
| DE | 43 06 831 A1 | 9/1994 |
| DE | 10 2004 026 610 A1 | 12/2005 |
| DE | 10 2007 009 754 A1 | 8/2008 |
| DE | 10 2008 018 861 A1 | 12/2009 |
| EP | 0 199 671 A2 | 10/1986 |
| EP | 0 431 302 A2 | 6/1991 |
| EP | 2 248 781 A2 | 11/2010 |

OTHER PUBLICATIONS

Eligehausen et al. ("Testing Anchors in Cracked Concrete," Concrete International, Jul. 2004, pp. 66-71, available online at http://www.iasonline.org/More/ci2607eligehausen.pdf).*
International Search Report for corresponding International Application No. PCT/EP2010/006980 mailed Apr. 12, 2011.
Form PCT/ISA/237 for corresponding International Application No. PCT/EP2010/006980 dated Apr. 12, 2011.
Search Report for corresponding German Application No. 10 2009 059 210.5.mailed Sep. 1, 2010.
International Preliminary Report on Patentability and Written Opinion for corresponding International Application No. PCT/EP2010/006980 issued Jul. 4, 2012.

* cited by examiner

*Primary Examiner* — Vu A Nguyen
(74) *Attorney, Agent, or Firm* — Renner, Otto, Boiselle & Sklar, LLP

(57) ABSTRACT

Two-component or multi-component fixing mortar, based on a free-radical-hardening unsaturated reactive resin, for embedding anchoring means in mortar in holes or crevices, which fixing mortar includes silanes which may or may not have reactive groups capable of participating in the polymerization with a synthetic resin based on free-radical-hardening unsaturated reactive resins but do in any case have Si-bonded hydrolysable groups, and, physically separate therefrom, a hardener.

16 Claims, No Drawings

FREE-RADICAL-POLYMERISABLE FIXING MORTAR HAVING SILANE ADDITIVES

The invention relates to a two-component or multi-component fixing mortar for embedding anchoring means in mortar in holes or crevices, based on unsaturated reactive resins which (after initiation, for example using a hardener) harden by means of free radicals, and to the use thereof for embedding anchoring means in mortar in holes or crevices.

A range of synthetic mortar systems based on an extremely wide variety of polymer-forming components is known, sometimes in the form of single-component systems and sometimes in the form of two-component or multi-component systems, which are used for embedding anchoring means, such as bolts or the like, in mortar in holes, such as drilled holes, or crevices, in each case in solid substrates such as, for example, masonry or concrete. Further components, for example façade coverings, can then be fixed to the anchoring means. The embedding of the anchoring means in mortar is based, on the one hand, on adhesive effects in the sense of a material-based connection between the synthetic mortar and an anchoring element and/or the wetted surface of the hole or crevice and, on the other hand, on an interlocking connection, such as, for example, undercuts formed by using the synthetic mortar to surround projecting or recessed portions of the anchoring element and/or of the hole or crevice.

An example of especially well suited systems are those based on unsaturated reactive resins and suitable hardeners.

FIS V 360 S® (fischerwerke GmbH & Co. KG, Waldachtal, Germany) is a very successful example, established on the market, of a two-component synthetic mortar system for embedding anchoring elements in mortar, based on an ethoxylated bisphenol-A-dimethacrylate in component A and on dibenzoyl peroxide as such a hardener in a physically separate component B, and in addition further constituents in each component.

Such synthetic mortar systems exhibit very good properties for fixing even in moist and dirty holes, but new regulations are especially raising the requirements to include conditions of relatively high wetness and residual dirt, such as, for example, in line with conditions described in the guidelines of the European Organisation for Technical Approvals (EOTA) (2001): ETAG No. 001, November 2006 edition, Guideline for European Technical Approval of Metal Anchors for Use in Concrete, Part 5: Bonded Anchors, February 2008, under 5.1.2.1 (b), where confined tests in non-cracked concrete C 20/25 are described, using inter alia electric hammer drills. The influence of the drill hole cleaning technique in a moist substrate is here (for the invention described hereinbelow) tested by way of example as follows, the concrete in the area of anchorage having to be water-saturated when the hole is drilled and cleaned and the anchoring element installed:

1. A hole with a diameter of approximately $0.5 \times d_0$ ($d_0$=drill hole diameter to be tested) is drilled in the concrete substrate to the anchorage depth to be tested.
2. The hole is filled with water and remains flooded for 8 days, until water has percolated into the concrete at a distance of 1.5 d to 2 d from the axis of the drilled hole.
3. The water is removed from the drilled hole.
4. The final hole is drilled at the diameter $d_0$ to be tested.

The hole is then cleaned with the hand pump and brush supplied by the manufacturer, the following procedure being adopted: one blowing operation with the hand blower/one brushing operation with the hand brush/one blowing operation with the hand blower. Then, the fixing mortar and an M12 anchoring element are introduced (for example using a 2-component cartridge with a static mixer in the test in the examples for the invention hereinbelow).

After the prescribed temperature-dependent minimum curing time, confined adhesion failure tests are then carried out, as set out in the Guideline for European Technical Approval of Metal Anchors for Use in Concrete, Part 5: Bonded Anchors, February 2008 edition, under 5.0 FIG. 2, in order to determine the adhesion failure strength of the embedded anchoring elements, for example as in the examples given hereinbelow or for the invention described in general terms hereinbelow, as follows:

In tests, the known free-radical-hardening unsaturated reaction systems already exhibit very good adhesion failure loads, but the new test systems and methods set further demands so that one problem lies in achieving even better properties, such as, in particular, even higher adhesion failure loads, also under those—difficult—conditions.

It has now been found, surprisingly, that the addition of certain silanes which, for example, may or may not have reactive groups capable of participating in the polymerisation with a fixing mortar based on free-radical-hardening unsaturated reactive resins but do in any case have Si-bonded hydrolysable groups, has an advantageous effect on such known free-radical-hardening unsaturated reactive resins, especially making it possible to achieve higher adhesion failure loads.

The invention accordingly relates, in a first embodiment, to a two-component or multi-component fixing mortar, based on a free-radical-hardening unsaturated reactive resin, for embedding anchoring means in mortar in holes or crevices, which is characterised in that it includes (as early as before the start of the hardening reaction), in addition to the reactive resin, one or more silanes that include no or at least one amino, sec-amino, mercapto, epoxy, isocyanato, alkenyl, (meth)acryloyl and/or anhydrido group(s), especially (meth)acryloyl groups, and at the same time include at least one Si-bonded hydrolysable group, and, physically separate therefrom (for example in a second component), a hardener, and in addition optionally further customary additives.

In a further embodiment (=form of implementation), the invention relates to the use of a two-component or multi-component fixing mortar for fixing anchoring means in holes or crevices, wherein said fixing mortar is based on a free-radical-hardening unsaturated reactive resin and includes (as early as before the start of the hardening reaction), in addition to the reactive resin, one or more silanes that include no or at least one amino, sec-amino, mercapto, epoxy, isocyanato, alkenyl, (meth)acryloyl and/or anhydrido group(s), especially (meth)acryloyl groups, and at the same time include at least one Si-bonded hydrolysable group (where hereinbefore and hereinbelow the free-radical-hardening unsaturated reactive resins are to be understood to be without or with reactive diluents that contain unsaturated groups and silanes that optionally include unsaturated groups) and, physically separate therefrom in a second component, a hardener, and in addition optionally further customary additives, for embedding anchoring means in mortar in holes or crevices, wherein said synthetic resin system and one or more anchoring means are introduced in succession or simultaneously into one or more holes or crevices and the fixing mortar is caused to cure (by mixing the hardener with the component(s) that contain(s) the free-radical-hardening reactive resin).

A further form of implementation of the invention relates to corresponding processes and methods for embedding anchoring elements in mortar in holes or crevices, in which a two-component or multi-component fixing mortar is used for embedding anchoring means in mortar, wherein the two-component or multi-component fixing mortar is based on a free-radical-hardening unsaturated reactive resin and includes (as early as before the start of the hardening reaction), in addition to the reactive resin, one or more silanes that include no or at least one amino, sec-amino, mercapto, epoxy, isocyanato, alkenyl, (meth)acryloyl and/or anhydrido group(s), especially (meth)acryloyl groups, and at the same time include at least one Si-bonded hydrolysable group, and, physically separate therefrom in a second component, a hardener, and in addition optionally further customary additives, wherein the fixing mortar and an anchoring means are introduced in succession, especially first the two-component or multi-component fixing mortar and then the anchoring means, or simultaneously into a hole or crevice in a substrate and the fixing mortar is caused to cure (by mixing the hardener with the component(s) that contain(s) the free-radical-hardening reactive resin).

Without wishing to be finally bound by this attempt at explanation, it is possible that the silane additives bring about better contact with the wetted substrate surface in the hole or crevice, whether it be an interlocking and/or a material-based connection.

It is very surprising that even high proportions not only are well tolerated by the system but can even result in especially effective fixing mortars according to the invention. A resulting cured synthetic mortar (which, for embedding anchoring systems in mortar, is likely to be thick-layered) may also have improved internal cohesion, which should likewise contribute to the high adhesion failure values. This is an especially surprising aspect of the present invention.

The fixing mortars according to the invention surprisingly also exhibit especially good properties in respect of their effectiveness in the tension zone, that is to say in cracked concrete. Other mechanical properties can also be positively influenced, such as, for example, maximum elongation at break and Young's modulus. It is entirely surprising that improved storage stability is also found, for example in the case of two-chamber capsules having the components of the fixing mortar according to the invention.

The cured compositions are accordingly preferably high-strength, low-flexibility solids having a Young's modulus of >0.5 GPa, preferably >1 GPa, a tensile strength of >1 MPa, preferably >5 MPa, and an elongation at break of <10%, preferably <5%, especially <2% (measured according to DIN EN ISO 527) and a compressive strength of >5 MPa, preferably >10 MPa, especially >20 MPa (measured according to DIN EN ISO 604).

Increased storage stability is also found, which can be determined in the manner described in the Examples.

Finally, increased effectiveness in cracked concrete compared with corresponding synthetic mortars without addition of silane can also be found in accordance with the methods of the guidelines of the European Organisation for Technical Approvals (EOTA) (2001): ETAG No. 001, November 2006 edition, Guideline for European Technical Approval of Metal Anchors for Use in Concrete, Part 5: Bonded Anchors, February 2008.

The definitions hereinbelow serve to clarify certain terms or symbols and to describe special forms of implementation of the invention; in the forms of implementation of the invention mentioned hereinabove and hereinbelow it is possible for single, some or all terms or symbols to be replaced by more specific definitions, resulting in special forms of implementation of the invention.

Where weights are given in percent (% by weight), unless otherwise specified they relate to the total mass of the reactants and additives of all components (in the liquid and paste-form ready-formulated state) of the fixing mortar, that is to say without packaging, i.e. the mass of the complete associated reactive resin formulation.

The one or more silanes that carry no or at least one amino, sec-amino, mercapto, epoxy, isocyanato, alkenyl, (meth) acryloyl (preferred) and/or anhydrido group(s) and include at least one Si-bonded hydrolysable group are, in special forms of implementation of the invention, those of formula I,

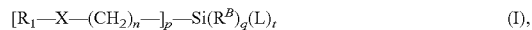

wherein
X denotes S or NH or O or NCO or nothing; with X being nothing (=absent) when $R_1$ denotes anhydrido;
$R_1$ denotes nothing, hydrogen, cycloalkyl, alkyl, aminoalkyl, epoxyalkyl, (meth)acryloyl (preferred), aryl, aralkyl, acyl, heterocyclyl (especially anhydrido) or a radical of formula $—[(CH_2)_{n*}]_{p*}—Si(R^{B*})_{3-t*}(L*)_{t*}$, wherein, in each case independently of the other radical, $R^{B*}$ is as defined below for $R^B$, $L*$ is as defined below for L and $n*$, $p*$ and $t*$ are in each case as defined below; with $R_1$ being hydrogen when X denotes S; with X being O when $R_1$ is epoxyalkyl or (meth)acryloyl; with $R_1$ being nothing when X denotes NCO (=isocyanato);
$R^B$, independently of any other, denotes an alkyl, alkenyl, arylalkyl or aryl group, preferably alkyl or alkenyl,
L denotes a hydrolysable radical, especially alkoxy,
n and, if present, $n*$ independently of one another denote a positive integer, especially from 1 to 10;
p denotes from 0 to 3 and, if present, $p*$ independently denotes from 1 to 3;
q denotes from 0 to 2; and
t denotes from 1 to 4 and, if present, $t*$ independently denotes from 1 to 3,
with the proviso that $p+q+t=4$ and, if present, $p*+(3-t*)+t*=4$.

In a special form of implementation of the invention, it is possible to use (at least also) those silanes which exhibit the alpha effect, that is to say, for example, those wherein n and, where applicable, $n*$ in the above formula I is 1 (n=1 and, where applicable, $n*=1$ in formula I), for example 3-(meth)acryloyl-oxymethyltrialkoxy(such as trimethoxy)-silane.

Further silanes having hydrolysable groups may be included, for example (based on the total weight of all silanes) up to 80% by weight, up to 70% by weight, up to 60% by weight, up to 50% by weight, up to 40% by weight, up to 30% by weight, up to 20% by weight or up to 10% by weight—this implies, for example, alkoxysilane compounds or silane cross-linkers, such as vinylalkoxysilanes, for example vinyltrimethoxysilane or vinyltriethoxysilane or esters of (poly)-silicic acid (such as, for example, Dynasilan® 40 (an ethyl polysilicate) or Dynasylan® A, Evonik GmbH, Frankfurt am Main, Germany), or mixtures of two or more thereof.

Silanes that include epoxy and/or isocyanate groups and/or (meth)acrylic groups and/or furthermore anhydrido groups and include at least one Si-bonded hydrolysable group are to be understood as being especially those carrying one or more groups selected from epoxy, isocyanate or, preferably, (meth) acrylate (which is to be understood as acrylate and/or methacrylate) and (furthermore) anhydrido groups and at least one Si-bonded hydrolysable group, such as, for example, corresponding preferred silanes of formula II,

wherein
Y denotes (meth)acryloyloxy or (furthermore) isocyanato (—N=C=O), epoxyalkoxy, or an anhydrido group;

$R^B$ denotes, independently of any other, an alkyl, arylalkyl or aryl group, preferably alkyl, L denotes a hydrolysable radical, especially alkoxy, a denotes a positive integer, especially from 1 to 10, more especially from 1 to 3; and t denotes from 1 to 3.

Special forms of implementation of the invention relate to those silanes of formula II in which Y denotes (meth)acryloyloxy and the other symbols are as defined in the preceding paragraph, because they are capable of polymerising not only with one another but also with the unsaturated groups of the free-radical-hardening unsaturated reactive resins.

Further special forms of implementation of the subject matter of the invention disclosed herein include silanes of formula III or the use thereof, $$Si(R^B)_{4-t}(L)_t \qquad (III),$$

wherein $R^B$ denotes, independently of any other(s), an alkyl, alkenyl, arylalkyl or aryl group, preferably alkyl or alkenyl, L denotes a hydrolysable radical, especially alkoxy, and t denotes from 1 to 4.

Mixtures with two or more of the silanes of formulae I, II and/or III mentioned in the two preceding paragraphs, or the use thereof in each case, also form special variants of the forms of implementation according to the invention.

Aryl is, within this disclosure, always preferably an aromatic radical having from 6 to 18 carbon atoms, for example phenyl, naphthyl or toluyl.

Aralkyl is, within this disclosure, always aryl as defined hereinbefore which is bonded to alkyl as defined above, for example benzyl or phenylethyl, but, in the case of lists within this disclosure, can preferably be omitted.

Cycloalkyl denotes especially mono-, di- or tri-cyclic, preferably monocyclic, cycloalkyl having from 3 to 20 carbon atoms, preferably having from 3 to 10 carbon atoms, in the ring, especially cyclopentyl or cyclohexyl.

Epoxyalkyl denotes preferably alkyl as defined above which is substituted by an epoxy group, with ring formation.

Epoxyalkyl (also in epoxyalkoxy) is especially epoxy-$C_1$-$C_7$alkyl, such as especially (2,3-epoxy-propan-1-yl) of formula

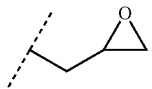

(the broken line marks the end of the bond to the rest of the molecule).

Acyl denotes, within this disclosure, always a radical of a carboxylic acid or of a sulfonic acid, for example an aryl-, alkyl- or aralkyl-carboxylic acid or -sulfonic acid radical, such as $C_1$-$C_7$alkanoyl, for example acetyl or propionyl, aroyl (aryl-C(=O)—), such as benzoyl, or the like.

Alkyl (also in alk(yl)oxy) denotes, within this disclosure, always especially an unbranched or singly or multiply branched alkyl radical having, for example, from 1 to 20, preferably from 1 to 10, carbon atoms, for example having from 1 to 4 carbon atoms, such as, for example, methyl, ethyl, n-propyl, isopropyl, n-butyl, sec-butyl, isobutyl or tert-butyl.

Alkenyl denotes, within this disclosure, always especially an unbranched or singly or multiply branched alkyl radical having one or more unsaturated bonds, with, for example, from 1 to 20, preferably from 1 to 10, carbon atoms, for example with from 1 to 4 carbon atoms, such as, for example, vinyl or allyl.

Aminoalkyl denotes alkyl, as just defined, substituted by one or more, especially one, amino group(s).

Heterocyclyl signifies especially a mono-, di- or tri-cyclic, especially monocyclic, radical having from 3 to 20, preferably from 3 to 8, ring atoms, of which one or more, especially two, is/are present as hetero atom(s), selected independently of one another from N, O and S and may be substituted by one or more oxo groups, especially those bonded to ring carbon atoms, which are bonded by way of an O hetero atom (resulting in anhydrido).

Heterocyclyl accordingly also includes especially anhydrido, which is a cyclic radical containing the following ring-closing bridging element: —C(=O)—O—C(=O)—. The ring therefore includes a carboxylic acid anhydride group. A possible preferred example is 2,5-dioxo-oxolan-3-yl; another example is the corresponding unsaturated variant 2,5 dioxo-oxolan-3-yl with the double bond between the carbon atoms in positions 3 and 4 of the ring, and a further example is a 2,5-dioxolan-3-yl radical benzo-fused in the 3,4-position.

Aromatic (for example aryl) means that the corresponding compounds contain aromatic radicals having from 6 to 18 carbon atoms, such as phenylene, naphthylene or fluorenylene, which may be unsubstituted or substituted (for example by one or more, e.g. up to three, $C_1$-$C_7$alkyl radicals, such as one or more methyl groups). Phenyl, naphthyl or toluyl is preferred as aryl.

"X denotes nothing" or "X being nothing" or the like means that the radical "—X—" in the formula in question denotes a single bond. $R_1$ being "nothing" means that the radical $R_1$ is absent.

"If present" relates to the fact that a radical or a symbol, depending on other definitions, may be present or absent, for example the fact that only when p in formula I is from 1 to 3 and $R_1$ denotes a radical of formula —$[(CH_2)_{n^*}]_{p^*}$—Si$(R^{B*})_{3-t^*}(L^*)_{t^*}$ is it possible for n*, p*, $R^{B*}$, L* and t* to be present at all.

"Include" or "comprise" means that other components or features may be present in addition to the components or features mentioned and therefore does not denote an exhaustive list, unlike "contain" the use of which does signify an exhaustive list of components or features.

"Partly or solely" means that the constituents that follow may be present in addition to other constituents of the component in question or may be the only constituents present, for example (e.g. in the case of the silanes or free-radical-hardening unsaturated reactive resins as components) based on the component defined in the particular case, in amounts of 10, 20, 30, 40, 50, 60, 70 or 80 to 90 or up to 100% by weight.

Where the attribute "furthermore" is mentioned, this means that greater preference may be given to features without this attribute.

(Meth)acrylic denotes acrylic, methacrylic or acrylic and methacrylic (in admixture).

Si-bonded hydrolysable groups (also denoted by the symbol L in this disclosure) are to be understood as, for example, halogen atoms (halogen, such as chloro), ketoximato, amino, aminoxy, mercapto, acyloxy, aryloxy, aralkyloxy (=aralkoxy) or especially alkyloxy (alkoxy).

Si-bonded hydrolysable groups are to be understood as being especially those groups L which are a constituent of a group of formula Z $$-Si(R^B)_{3-t}(L)_t \qquad (Z),$$

wherein $R^B$, independently of any other, denotes an alkyl, alkenyl, arylalkyl or aryl group, preferably alkyl, t denotes an integer from 1 to 3, and L denotes an Si-bonded hydrolysable group, especially alkoxy.

The one or more silane(s) that are added according to the invention and include no or at least one amino, sec-amino, mercapto, epoxy, isocyanato, alkenyl, (meth)acryloyl and/or anhydrido group(s), especially (meth)acryloyl groups, and at the same time include at least one Si-bonded hydrolysable group, have preferably average or absolute molecular weights of 2000 or less, 1000 or less, 900 or less, 800 or less, 700 or less, 600 or less or especially 500 or less or especially 400 or less.

In special forms of implementation of the invention there are used as silanes of formula I (added according to the invention) one or more selected from the group 3-aminopropyltrialkoxysilanes, such as 3-aminopropyl-trimethoxysilane or 3-amino-propyl-triethoxysilane, 3-glycidyloxypropyl-trialkoxysilanes, such as 3-glycidyloxy-propyl-trimethoxysilane, bis(3-trialkoxysilylpropyl)amine, such as bis(3-trimethoxysilyl-propyl)amine or bis(3-triethoxysilylpropyl)amine, N-(n-butyl)-3-aminopropyl-trialkoxysilane, such as N-(alkyl, such as n-butyl)-3-aminopropyl-trimethoxysilane or N-(alkyl, such as n-butyl)-3-aminopropyl-triethoxysilane, 3-mercaptopropyl-trialkoxysilane, such as 3-mercaptopropyl-trimethoxysilane, and (as a special variant) 3-(meth)acryloyl-oxypropyl-trialkoxysilanes, such as 3-(meth)acryloyl-oxypropyl-trimethoxysilane or -triethoxysilane or 3-(meth)acryloyl-oxymethyl-trimethoxysilane or -triethoxysilane, and/or alkenylalkoxysilanes such as vinyltrimethoxysilane or vinyltriethoxysilane, and/or tetraalkoxysilane, such as tetraethoxysilane, tetramethoxysilane or tetrapropoxysilane or (preferably or furthermore) alkoxypolysilicate, such as ethyl or propyl polysilicate; or mixtures of two or more thereof.

The silanes that carry no or at least one amino, sec-amino, mercapto, epoxy, isocyanato, alkenyl, (meth)acryloyl and/or anhydrido group(s) and include at least one Si-bonded hydrolysable group are present in a fixing mortar according to the invention or for use according to the invention in a proportion by weight of, for example, from 0.1 to 25% by weight, especially of 1 or more % by weight, such as from 1 to 20% by weight, preferably of 2 or more % by weight, such as from 2 to 20 or up to 15% by weight, of 3 or more % by weight, such as from 3 to 20 or up to 10% by weight, more especially of 4 or more % by weight, for example from 4 to 20 or up to 6% by weight.

Free-radical-hardening unsaturated reactive resins are to be understood as being especially those which include, as free-radical curing (which includes curable (for example prior to addition of hardener)) components, organic compounds having unsaturated (for example olefinic) radicals or, especially, which consist thereof, especially those which comprise hardenable esters with unsaturated carboxylic acid radicals; for example especially (meth)acrylate or (meth)acrylamide monomers, such as acrylic acid and/or methacrylic acid, or preferably esters thereof (referred to as (meth)acrylates) or amides, especially (meth)acrylates such as mono-, di-, tri- or poly-(meth)acrylates (including hydroxypropyl (meth)acrylate, hydroxyethyl (meth)acrylate, ethylene glycol di(meth)acrylate, butanediol di(meth)acrylate, hexanediol dimethacrylate or (preferably in each case propoxylated or, especially, ethoxylated) aromatic diol-, such as bisphenol-A-, bisphenol-F- or novolak-(especially di-) (meth)acrylate), epoxy(meth)acrylates (especially in the form especially of reaction products of di- or poly-epoxides, for example bisphenol-A-, bisphenol-F- or novolak-di- and/or -poly-glycidyl ethers, with unsaturated carboxylic acids, for example $C_2$-$C_7$alkenecarboxylic acids, such as especially (meth)acrylic acid), urethane- and/or urea-(meth)acrylates, and/or unsaturated polyester resins, or the like; or a mixture of two or more of such hardenable unsaturated organic components.

Examples of epoxy(meth)acrylates present or used in special forms of implementation of the invention are those of formula

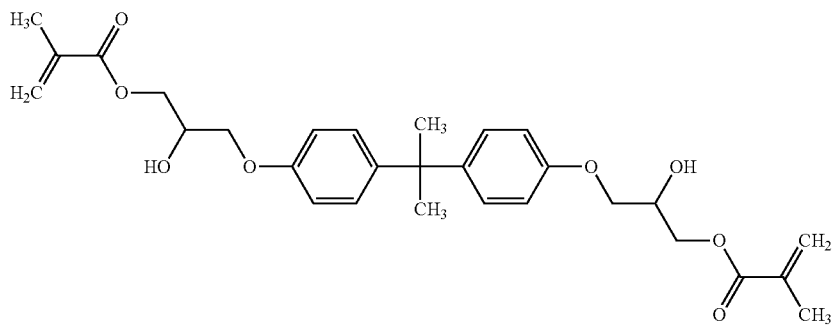 [SMILES: C=C(C)C(=O)OCC(O)COc1ccc(C(C)(C)c2ccc(OCC(O)COC(=O)C(=C)C)cc2)cc1]

or, more generally, taking into account the prelengthening reaction in the preparation of the bisphenol-A diglycidyl ether of formula

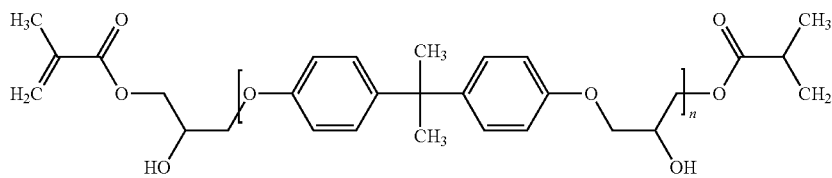

wherein n denotes a number greater than or equal to 1 (when mixtures of different molecules having different n values are present and are represented by the formula, non-integer numbers are also possible as a mean value).

Examples of propoxylated or, especially, ethoxylated aromatic diol-, such as bisphenol-A-, bisphenol-F- or novolak- (especially di-)(meth)acrylates that can be used in special forms of implementation of the invention are those of formula

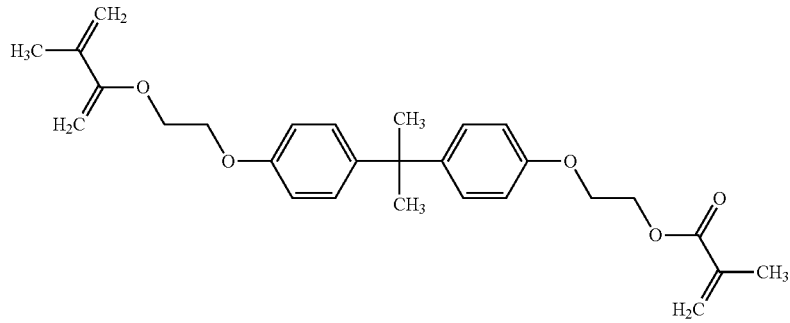 [SMILES: C=C(C)C(=C)OCCOc1ccc(C(C)(C)c2ccc(OCCOC(=O)C(=C)C)cc2)cc1]

or, generally, also taking into account higher degrees of ethoxylation:

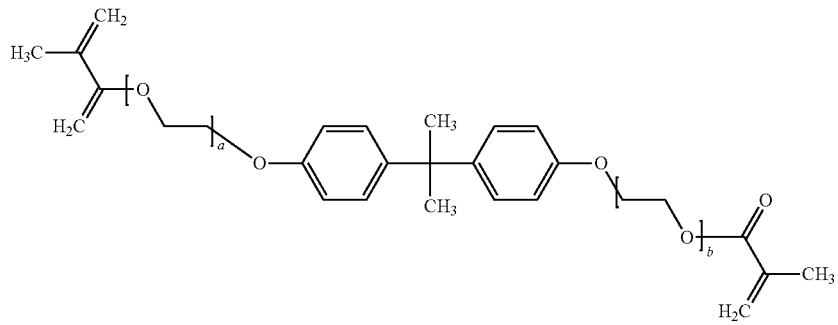

wherein a and b each independently of the other denote a number greater than or equal to 0, with the proviso that preferably at least one of the values is greater than 0, preferably both values being 1 or more (when mixtures of different molecules having different (a and b) values are present and are represented by the formula, non-integer numbers are also possible as a mean value).

The free-radical-hardenable unsaturated reactive resin (or the total amount of its components) is present, for example, in a proportion by weight of from 5 to 99.5%, such as approximately from 10 to 98.5%, for example from 10 to 89.5%.

"Based on" means that the fixing mortars according to the invention can include, in addition to the mentioned components, such as (A) and (B) as defined below, also further customary ingredients (for example additives or other constituents mentioned above or below). Such further ingredients can be present together, for example in an amount of in total up to 80% by weight, preferably between 0.01 and 65% by weight. Even where "based on" is not expressly mentioned, such customary ingredients are included.

Important examples of further ingredients are accelerators, inhibitors, reactive diluents, thixotropic agents, fillers and further additives.

As aminic accelerators there come into consideration those having sufficiently great activity, such as especially (preferably tertiary, especially hydroxyalkylamino-group-substituted) aromatic amines selected from the group selected from epoxyalkylated anilines, toluidines or xylidines, such as, for example, ethoxylated toluidine, aniline or xylidine, for example N,N-bis(hydroxymethyl or hydroxyethyl)-toluidines or -xylidines, such as N,N-bis(hydroxypropyl or hydroxyethyl)-p-toluidine, N,N-bis(hydroxyethyl)-xylidine and more especially corresponding higher alkoxylated technical products. One or more such accelerators are possible.

The accelerators preferably have a content (concentration) of from 0.005 to 10%, especially from 0.1 to 5% by weight.

As inhibitors there can be added, for example, non-phenolic (anaerobic) and/or phenolic inhibitors.

As phenolic inhibitors (which are often provided as a component already added to commercial free-radical-hardening reactive resins but, furthermore, may also be absent) there come into consideration (non-alkylated or alkylated) hydroquinones, such as hydroquinone, mono-, di- or tri-methyl hydroquinone, (non-alkylated or alkylated) phenols, such as 4,4'-methylene-bis(2,6-di-tert-butylphenol), 1,3,5-trimethyl-2,4,6-tris(3,5-di-tert-butyl-4-hydroxybenzyl)-benzene, (non-alkylated or alkylated) pyro-catechols, such as tert-butyl-pyrocatechol, 3,5-di-tert-butyl-1,2-benzenediol or 4-tert-butyl-1,2-benzenediol, or especially 4-methoxyphenol, or mixtures of two or more thereof. These have, based on the reactive resin formulation, preferably a content of up to 1% by weight, especially between 0.0001 and 0.5% by weight, for example between 0.01 and 0.1% by weight.

As non-phenolic or anaerobic (that is to say, unlike the phenolic inhibitors, active also without oxygen) inhibitors (which especially have scarcely any effect on the curing times) there come into consideration preferably phenothiazine or organic nitroxyl free radicals. As organic nitroxyl free radicals there can be added, for example, those described in DE 199 56 509, which are incorporated herein by reference especially in respect of the compounds mentioned therein, especially 1-oxyl-2,2,6,6-tetramethyl-piperidin-4-ol ("4-OH-TEMPO"). The proportion by weight of the non-phenolic inhibitors is preferably in the range of from 1 ppm to 2% by weight, especially in the range of from 10 ppm to 1% by weight, based on the reactive resin formulation.

As thixotropic agents there can be used customary thixotropy-imparting rheology aids, such as pyrogenic silica. They can be added, for example, in a proportion by weight of from 0.01 to 50% by weight, for example from 1 to 20% by weight.

As fillers there are used customary fillers, especially cements (for example Portland cements or alumina cements), chalks, sand, quartz sand, quartz powder or the like, which can be added in the form of powder, in granular form or in the form of shaped bodies, or other fillers, such as, for example, those mentioned in WO 02/079341 and WO 02/079293 (which in this regard are incorporated herein by reference), or mixtures thereof, it being possible for the fillers furthermore or especially also to be silanised, for example in the form of methacrylosilane-treated quartz powder, such as Silbond MST® from Quarzwerke GmbH, in the form of methacrylosilane-treated silica, such as Aktisil MAM® from Hoffmann Mineral, or methacryloxypropyl-trimethoxysilane-treated pyrogenic silica, such as Aerosil R 711® from Evonik. The fillers can be present in one or more components of a multi-component kit according to the invention, for example one or both components of a corresponding two-component kit; the content of fillers is preferably from 0 to 90% by weight, for example from 10 to 90% by weight (in the case of the installation of anchoring elements, broken casing material (for example splintered glass or splintered plastics), for example fragments of capsules, can be, and preferably is, also counted as filler). In addition or alternatively, hydraulically hardenable fillers, such as gypsum, calcined chalk or cement (for example alumina cement or Portland cement), water glass or active aluminium hydroxides, or two or more thereof, can be added.

Further additives may also be added, such as plasticisers, non-reactive diluents, flexibilisers, stabilisers, rheology aids, wetting agents, colouring additives, such as dyes or especially pigments, for example for staining the components different colours for better monitoring of their intermixing, or the like, or mixtures of two or more thereof. Such further additives can preferably be added in total in proportions by weight of in total from 0 to 90%, for example from 0 to 40% by weight.

As "reactive diluents" to preferred vinyl esters it is possible, in addition, for other hardenable unsaturated, such as olefinic, compounds, for example selected from mono-, di-, tri- or poly-(meth)acrylates, such as hydroxyalkyl (meth) acrylates, such as hydroxypropyl methacrylate, other (meth) acrylic acid esters, such as (without this list being exhaustive) acetacetoxyalkyl (meth)acrylate, (meth)acrylic acid methyl ester, 1,4-butanediol di(meth)acrylate, 1,2-ethanediol di(meth)acrylate, diethyl glycol di(meth)acrylate, trimethylolpropane tri(meth)acrylate, or polyethylene glycol di(meth)-acrylate; styrenes, such as styrene, α-methyl styrene, vinyl toluene, tert-butyl styrene and/or divinyl benzene, or mixtures of two or more thereof, to be provided as constituents that cure in parallel with the free-radical-hardening unsaturated reactive resin, for example in a proportion by weight of from 0.1 to 90% by weight, for example between 0.5 and 75% by weight or between 1 and 40% by weight.

The hardener includes at least one peroxide as actual initiator. The term "hardener" hereinabove and hereinbelow preferably means pure initiators or stabilised initiators, with or without addition of filler, and/or further additives, such as water, thickeners and/or further added ingredients, such as dyes, additives and the like, in other words the complete hardener component. For stabilisation, customary additives, such as gypsum, chalk, pyrogenic silica, phthalates, chlorinated paraffins or the like, can be added. In addition, fillers and/or (especially for the preparation of a paste or emulsion) solvents, especially water, thickeners, fillers (for example those mentioned above) and further additives of those mentioned above can also be added, it being possible for water to serve as hardener for the condensation of the silanes that include hydrolysable groups. The content of all additives can be, for example, a proportion by weight of in total from 0.1 to 70% by weight, for example from 1 to 40% by weight.

Based on the hardener component, the content of initiator in a possible preferred form of implementation of the invention is from 1 to 90% by weight, especially from 5 to 30% by weight.

As initiator for the hardening of the reactive resin formulations according to the invention there are used in the case of free-radical polymerisation, for example free-radical-forming peroxides, for example organic peroxides, such as diacyl peroxides, for example dibenzoyl peroxide, ketone peroxides, such as methyl ethyl ketone peroxide or cyclohexanone peroxide, or alkyl peresters, such as tert-butyl perbenzoate, inorganic peroxides, such as persulfates or perborates, and also mixtures thereof.

The proportion of hardener in a fixing mortar according to the invention, based on the mass of all reactants and additives without the packaging, preferably lies in a range of from 1 to 60% by weight, for example from 2 to 50% by weight, the proportion of peroxide, likewise based on the mass of the total associated reactive resin formulation (100%), being especially 0.1 or more % by weight, preferably from 1.5 to 10% by weight.

A hole or crevice is to be understood as being a hole or crevice that is present in a solid substrate, especially masonry or concrete, and is accessible from the outside, for example a drilled hole or a recessed region made during mortaring with cement or gypsum, or the like.

In a special form of implementation of the invention, the free-radical-hardenable unsaturated reactive resin(s) and the silane(s) that are added in accordance with the invention and that include at least one amino, sec-amino, mercapto, epoxy, isocyanato, alkenyl, (meth)acryloyl and/or anhydrido group, especially (meth)acryloyl groups, and at the same time include at least one Si-bonded hydrolysable group, are included in a component A, and the hardener is included in a component B of a two-component system.

Such two-component systems are especially two-component systems in which the ratio by weight of component A to component B is from 99:1 to 1:99, from 99:1 to 50:50, from 99:1 to 60:40 or from 99:1 to 70:30.

Components that would otherwise undesirably react with one another, such as water and the hydrolysable groups of the silanes to be used according to the invention, or water and cement, are preferably to be kept separate from one another prior to use in the hole or crevice.

The fixing mortars according to the invention can consequently preferably be provided, and also used, in the form of two-component or multi-component systems (multi-component kit). Two-component systems are also those which include one component, for example, in encapsulated form in the other component.

A multi-component kit is especially a two-component kit having a component (A), which includes one or more free-radical-hardenable unsaturated compounds, as described hereinabove and hereinbelow, and hardener (component (B)), it being possible to provide further additives in one or both of the components, wherein the components (A) and (B) that are able to react with one another and optionally further separate components are present in such a way that they cannot react with one another during storage, preferably in such a way that they cannot come into contact with one another prior to use, but that enables components (A) and (B) (and optionally further components) to be mixed together for fixing at the desired location, for example directly in front of or in a hole, and if necessary introduced in such a way that the hardening reaction can take place therein. Especially suitable are capsules (which are especially preferred), for example made of plastics, ceramics or especially glass, in which the components are separated from one another by means of rupturable boundary walls (which can be ruptured, for example, when an anchoring element is driven into a hole or a crevice, such as a drilled hole) or integrated separate rupturable containers, for example in the form of capsules, such as ampoules, arranged one inside the other; and also multi-component or especially two-component cartridges (which are likewise especially preferred), the chambers of which contain the plurality of components or preferably the two components (especially (A) and (B)) of the fixing mortar according to the invention having the compositions mentioned hereinabove and hereinbelow for storage prior to use, the kit in question preferably also including a static mixer.

The use of a fixing mortar according to the invention at the desired site of use is effected by mixing the associated components, especially close to or directly in front of a hole or (for example especially when static mixers are used or when suitable capsules are broken) inside a hole or crevice, for example a drilled hole.

Embedding in mortar is especially to be understood as meaning (material-based and/or interlocking) fixing of anchoring means made of metal (for example undercut anchors, threaded rods, screws, drill anchors, bolts) or, furthermore, made of some other material, such as plastics or wood, in solid substrates, such as concrete or masonry, especially insofar as they are components of artificially erected structures, more especially masonry, ceilings, walls, floors, panels, pillars or the like (for example made of concrete, natural stone, masonry made of solid blocks or perforated blocks, furthermore plastics or wood), especially in holes, such as drilled holes. Those anchoring means can then be used to secure, for example, railings, covering elements such as panels, façades or other structural elements.

The introduction of the anchoring means is preferably effected only a short time, preferably 30 minutes or less, after the components of the fixing mortar according to the invention have been mixed together. In explanation: the mixing or introduction of the components on or into the desired locations at which anchoring means are to be fixed, especially holes, such as drilled holes, initiates a plurality of reactions which take place substantially in parallel and/or with only a very small time interval between them, especially chain polymerisation. The final curing takes place in situ.

Specific forms of implementation of the invention also relate to:

(a) A two-component or multi-component fixing mortar, based on a free-radical-hardening unsaturated reactive resin, for embedding anchoring means in mortar in holes or crevices, characterised in that it includes silanes which may or may not have reactive groups capable of participating in the polymerisation with a synthetic resin based on free-radical-hardening unsaturated reactive resins but do in any case have at least one Si-bonded hydrolysable group, and, physically separate therefrom, a hardener.

(b) A fixing mortar in accordance with paragraph (a), characterised in that it includes partly or solely as silanes one or more silanes that carry no or at least one amino, sec-amino, mercapto, epoxy, isocyanato, alkenyl, (meth)acryloyl and/or anhydrido group(s) and include at least one Si-bonded hydrolysable group.

(c) Fixing mortar in accordance with paragraph (a) or (b), characterised in that it includes as silanes partly or solely those of formula I, as defined above.

(d) Fixing mortar in accordance with one of paragraphs (a) to (c), characterised in that it includes as silanes partly or solely those exhibiting the alpha effect.

(e) Fixing mortar in accordance with one of paragraphs (a) to (d), characterised in that the silanes have partly or solely reactive groups (especially unsaturated groups) capable of participating in the polymerisation with a synthetic resin based on free-radical-hardening reactive resins.

(f) Fixing mortar in accordance with one of paragraphs (a) to (e), characterised in that it includes as silanes partly or solely those of formula II, as defined above.

(g) Fixing mortar in accordance with paragraph (f), characterised in that it includes as silanes partly or solely those of formula II in which Y denotes (meth)acryloyloxy and the other symbols are as defined for formula II.

(h) Fixing mortar in accordance with one of paragraphs (a) to (g), characterised in that it includes as silanes partly or solely those of formula III, as defined above.

(i) Fixing mortar in accordance with one of paragraphs (a) to (h), characterised in that as Si-bonded hydrolysable groups in the silanes there are present one or more selected from halogen, ketoxime groups, amino, aminoxy, mercapto, acyloxy, aryloxy, aralkyloxy (=arylalkoxy) and especially alkoxy.

(j) Fixing mortar in accordance with one of paragraphs (a) to (i), characterised in that it includes water in the hardener (the water being able to react with the hydrolysable groups of the silanes and, where applicable, with cement or other hydraulically hardenable substances).

(k) Fixing mortar in accordance with one of paragraphs (a) to (j), characterised in that it includes hydraulically hardenable substances, such as cements (for example Portland cement or alumina cements), in the component that includes the free-radical-hardening unsaturated reactive resins and the silanes.

(l) Fixing mortar in accordance with one of paragraphs (a) to (k), characterised in that as silane there are included 3-aminopropyl-trialkoxysilane, 3-glycidyloxypropyl-trialkoxysilane, bis(3-trialkoxysilylpropyl)amine, N-(alkyl)-3-aminopropyl-trialkoxysilane, 3-mercaptopropyl-trialkoxysilane, or especially 3-(meth)acryloyl-oxypropyl-trialkoxysilane, alkenyl-trialkoxysilane or tetraalkoxysilane, or alkoxy polysilicate or mixtures of two or more thereof.

(m) Fixing mortar in accordance with one of paragraphs (a) to (l), characterised in that as silane there are included partly or only 3-(meth)acryloyloxypropyl-trimethoxysilane, 3-(meth)acryloyloxypropyl-triethoxysilane, 3-(meth)acryloyloxymethyl-trimethoxysilane, 3-(meth)acryloyloxymethyl-triethoxysilane, vinyltrimethoxysilane, vinyltriethoxysilane, or tetraethoxysilane, tetramethoxysilane, tetrapropoxysilane, or ethyl or propyl polysilicate, or mixtures of two or more thereof.

(n) Fixing mortar in accordance with one of paragraphs (a) to (m), characterised in that as free-radical-hardening unsaturated reactive resins there are included one or more selected from (meth)acrylic acid, mono-, di-, tri- or poly-(meth)acrylates, epoxy(meth)-acrylates, urethane- and/or urea-(meth) acrylates, and unsaturated polyester resins having an unsaturated carboxylic acid component, preferably propoxylated or especially ethoxylated aromatic diol-, such as bisphenol-A-, bisphenol-F- or novolak-(especially di-)(meth)acrylates with or without the presence of reactive diluents.

(o) Fixing mortar in accordance with one of paragraphs (a) to (n), characterised in that as free-radical-hardening unsaturated reactive resins there are included partly or solely one or more of formula

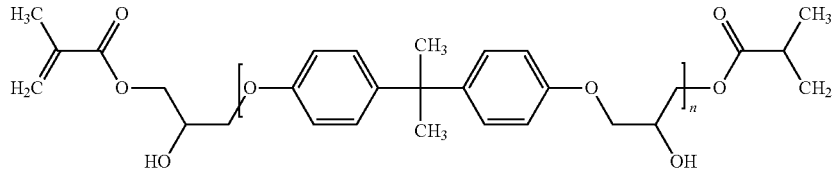

wherein n denotes a number greater than or equal to 1, but when mixtures of different molecules having different n values are present and are represented by the formula, non-integer numbers are also possible as a mean value; and/or of formula

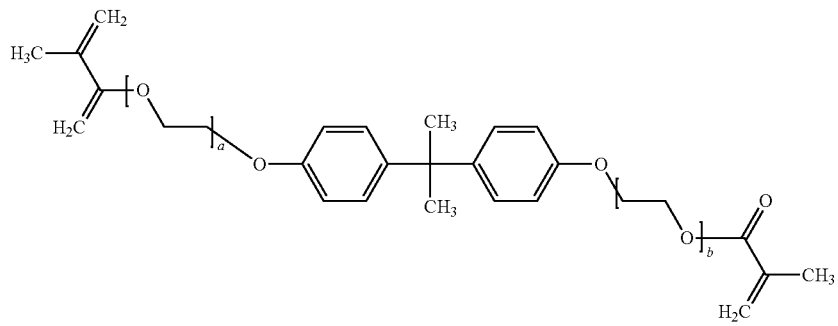

wherein a and b each independently of the other denote a number greater than or equal to 0, with the proviso that preferably at least one of the values is greater than 0, preferably both values being 1 or more (when mixtures of different molecules having different a and b values are present and are represented by the formula, non-integer numbers are also possible as a mean value), preferably, based on the total amount by weight of the free-radical-hardening unsaturated reactive resins, in a proportion of from 10 to 100% by weight, wherein there may be additionally included one or more reactive diluents selected from mono-, di-, tri- or poly-(meth)acrylates, such as hydroxyalkyl (meth)acrylates, acetacetoxyalkyl (meth)acrylate, methacrylic acid methyl ester, 1,4-butanediol di(meth)acrylate, 1,2-ethanediol dimethacrylate, diethyl glycol di(meth)acrylate, trimethylolpropane tri(meth)acrylate or polyethylene glycol di(meth)acrylate; styrene, α-methyl styrene, vinyl toluene, tert-butyl styrene and divinyl benzene, or mixtures of two or more thereof, in a proportion by weight, based on the total amount by weight of the free-radical-hardening reactive resins, of from 0 to 95% by weight, such as from 0.1 to 80% by weight, from 0.2 to 70% by weight or from 0.3 to 60% by weight.

(p) Fixing mortar in accordance with one of paragraphs (a) to (n), characterised in that it is a two-component system, especially in the form of a two-chamber cartridge without or with a static mixer or a two-chamber capsule (for example comprising an outer and an inner ampoule).

(q) Use of a fixing mortar in accordance with one of paragraphs (a) to (p) for embedding anchoring means in mortar in holes or crevices, especially in drilled holes, such as moist drilled holes, in which the fixing mortar and an anchoring means are introduced into a hole or crevice and the fixing mortar is caused to cure.

(r) Process or method for embedding anchoring elements in mortar in holes or crevices, in which a fixing mortar in accordance with one of paragraphs (a) to (p) is used for embedding anchoring means in mortar, the fixing mortar and an anchoring means being introduced into a hole or crevice and the fixing mortar being caused to cure.

(s) Use, or a process including such use, especially in accordance with paragraph (q) or paragraph (r), of a fixing mortar in accordance with one of paragraphs (a) to (p) for embedding anchoring means in mortar, for example commercially available threaded rods, in the tension zone, that is to say in cracked concrete or, furthermore, concrete at risk of cracking.

(t) Use of silanes, such as included in one of paragraphs (a) to (p), for prolonging the storage ability of a fixing mortar in accordance with one of paragraphs (a) to (p).

(u) Fixing mortar in accordance with one of paragraphs (a) to (p), characterised in that after curing it meets at least the criterion of crack resistance in static linear cracking (functioning in cracked concrete) in accordance with ETAG 01 Part 5 $\alpha_{req}$ of 0.8 and in dynamic linear cracking (functioning in crack movement) in accordance with ETAG 01 Part 5 $\alpha_{req}$ of 0.9.

(v) Fixing mortar in accordance with one of paragraphs (a) to (p), characterised in that its storage stability is prolonged by at least 10, 20, 50, 100 or 150% in comparison with a corresponding silane-free fixing mortar at 120° C.

The following Examples serve to illustrate the invention but do not limit the scope thereof. Proportions are given in % by weight, based on the total mass of the components of the total composition forming the liquid/paste-form portions.

EXAMPLE 1

Comparison Example (Without Silane Additive According to the Invention)

Here a two-component injection synthetic mortar system (product number FIS V 360 S (fischerwerke GmbH & Co. KG, Waldachtal, Germany)) having the following composition is used:

Component (A): vinyl ester resin (ethoxylated bisphenol-A-dimethacrylate), hydroxypropyl methacrylate, further methacrylic acid esters, phenolic inhibitors, aminic accelerators, thixotropic agents, Portland cement, quartz sands, additives (including dyes).

Component (B): dibenzoyl peroxide, water, thickeners, fillers (quartz sand), additives (including dyes).

The components are subjected to an adhesion failure test, using a commercially available two-chamber cartridge with a static mixer, in line with the conditions described above for the use of the guidelines of the "European Organisation for Technical Approvals" (EOTA) (2001): ETAG No. 001 November 2006 edition, Guideline for European Technical Approval of Metal Anchors for Use in Concrete", Part 5: Bonded Anchors, February 2008, under 5.1.2.1 (b) and the mean value of the adhesion failure load from five tests for M12 bolts at an anchoring depth of 95 mm is determined. That value is 75 kN. The Young's modulus, the tensile strength, the elongation at break and the compressive strength are determined in accordance with the standards described in the general part, the following values being obtained:

| Young's modulus [GPa] | Tensile strength [MPa] | Elongation at break [%] | Compressive strength [MPa] |
|---|---|---|---|
| 3.7 | 10.6 | 0.8 | 59.4 |

EXAMPLES 2 and 3

Fixing Mortar With the Silane Additive According to the Invention

The silane mentioned in the following Table was added to the injection synthetic mortar system mentioned in Example 1 in component (A), in each case in a proportion by weight of 5% by weight, based on the total weight of components (A) and (B), whereupon the adhesion failure loads likewise mentioned in Table 1 were found:

TABLE 1

| Example | Additive | Average adhesion failure load [kN] | Change in % |
|---|---|---|---|
| Comparison Example 1 | None | 75.0 | — |
| Example 2 | 5% methacryloxypropyl-trimethoxysilane | 101.1 | +34.8% |
| Example 3 | 5% tetraethoxysilane | 83.7 | +11.6% |

For the composition from Example 2 (with 5% methacryloxypropyl-trimethoxysilane) the Young's modulus, the tensile strength, the elongation at break and the compressive strength are determined in accordance with the standards described in the general part, the following values being obtained:

| Young's modulus [GPa] | Tensile strength [MPa] | Elongation at break [%] | Compressive strength [MPa] |
|---|---|---|---|
| 3.7 | 16.3 | 0.6 | 63.9 |

EXAMPLES 4-7

Further Fixing Mortars with the Silane Additive According to the Invention

The silane mentioned in Table 2 below was added to the injection synthetic mortar system mentioned in Example 1 in component (A), in each case in a proportion by weight of 5% by weight, based on the total weight of components (A) and (B):

TABLE 2

| Example | Additive |
|---|---|
| Example 4 | 3-glycidyloxypropyl-trimethoxysilane |
| Example 5 | bis(3-trimethoxy-silylpropyl)amine |
| Example 6 | N-(n-butyl-3-amino-propyl-trimethoxysilane |
| Example 7 | 3-mercaptopropyl-trimethoxysilane |

EXAMPLES 8 to 13

Cartridges Having a Static Mixer and Two-Component Fixing Mortars According to the Invention In two-chamber cartridges having a total content of 360 ml and a mixing ratio component A:component B of 5:1, the two chambers are filled with component A and component B of a fixing mortar in accordance with one of Examples 2 to 7, and the cartridges are closed and packaged together with a static mixer FIS S to form two-component kits.

EXAMPLE 14

Storage Stability of Capsules

Capsules M12 are each filled with Fischer RM capsule resin (a formulation of ethoxylated bisphenol-A-dimethacrylate, hydroxypropyl methacrylate, butanediol dimethacrylate, aminic accelerators, phenolic inhibitors and additives) and quartz sand and additionally with silanes and are stored at 120° C. Checks as to when gelation occurs are made every half an hour. The results are shown in the following Table:

| System | Gelation [h] |
|---|---|
| fischer RM capsule resin | 10.5 |
| fischer RM capsule resin with 8% methacryloxy-propyl-trimethoxysilane | 64 |
| fischer RM capsule resin with 8% Dynasylan 40 | 39 |

It is thus ascertained, surprisingly, that the storage stability is significantly increased by the silane additives.

EXAMPLE 15

Suitability for Use in Static and Dynamic Linear Cracking

For a formulation corresponding to Example 2 above, the suitability for use in static linear cracking (test criterion in accordance with ETAG 01 Part 5) and in dynamic linear cracking (test criterion in accordance with ETAG 01 Part 5) were checked using commercially available threaded rods.

Significant improvements over the silane-free formulation in accordance with Example 1 are obtained, in that the formulation from Example 1 does not meet the required test criteria of ETAG 01 Part 5 in respect of tests in cracked concrete—neither in static linear cracking nor in dynamic linear cracking is the $\alpha_{req}$ of 0.8 or 0.9, respectively, achieved, whereas the $\alpha_{req}$ required for meeting the test criteria are achieved, for example, with a silane-containing composition in accordance with Example 2.

The invention claimed is:

1. A method for embedding an anchoring element in mortar in a hole or crevice, the method comprising:
introducing into the hole or crevice a fixing mortar and an anchoring means, the fixing mortar comprising: (a) at least one resin component comprising at least one free-radical-hardening unsaturated reactive resin and at least one silane having no or at least one amino, sec-amino, mercapto, epoxy, isocyanato, alkenyl, (meth)acryloyl and/or anhydrido group(s) and including at least one Si-bonded hydrolysable group, and (b) at least one hardener component comprising at least one hardener, wherein the hardener component is physically separate from the resin component; and
curing the fixing mortar.

2. The method according to 1, wherein the anchoring means comprises a threaded rod.

3. The method according to claim 1, wherein the anchoring means is embedded in a tension zone comprising cracked concrete or concrete at risk of cracking.

4. The method according to claim 1, wherein the fixing mortar comprises at least one silane having the formula I:

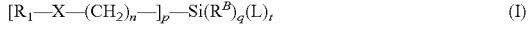

$$[R_1-X-(CH_2)_n-]_p-Si(R^B)_q(L)_t \quad (I)$$

wherein
X denotes S or NH or O or NCO or nothing; with X being nothing when $R_1$ denotes anhydrido;
$R_1$ denotes nothing, hydrogen, cycloalkyl, alkyl, aminoalkyl, epoxyalkyl, (meth)acryloyl, aryl, aralkyl, acyl, heterocyclyl, anhydrido or a radical of formula $-[(CH_2)_{n*}]_{p*}-Si(R^{B*})_{3-t}(L^*)_{t*}$, wherein, in each case independently of the other radical, $R^{B*}$ is as defined below for $R^B$, $L^*$ is as defined below for L and $n^*$, $p^*$ and $t^*$ are in each case as defined below; with $R_1$ being hydrogen when X denotes S; with X being O when $R_1$ is epoxyalkyl or (meth)acryloyl; with $R_1$ being nothing when X denotes NCO;
$R^B$, independently of any other, denotes an alkyl, alkenyl, arylalkyl or aryl group,
L denotes a hydrolysable radical,
n and, if present, $n^*$ independently of one another denote a positive integer;
p denotes from 0 to 3 and, if present, $p^*$ independently denotes from 1 to 3;
q denotes from 0 to 2; and
t denotes from 1 to 4 and, if present, $t^*$ independently denotes from 1 to 3, with the proviso that p+q+t=4 and, if present, $p^*+(3-t^*)+t^*=4$.

5. The method according to claim 1, wherein the fixing mortar comprises at least one silane exhibiting the alpha effect.

6. The method according to claim 1, wherein the fixing mortar comprises at least one silane having one or more reactive groups capable of participating in polymerisation with a synthetic resin based on a free-radical-hardening unsaturated reactive resin.

7. The method according to claim 1, wherein the fixing mortar comprises at least one silane having the formula III:

$$Si(R^B)_{4-t}(L)_t \quad (III)$$

wherein $R^B$ denotes, independently of any other(s), an alkyl, alkenyl, arylalkyl or aryl group,
L denotes a hydrolysable radical, and
t denotes from 1 to 4.

8. The method according to claim 1, wherein the Si-bonded hydrolysable group of the silane is selected from among halogen, ketoximate groups, amino, aminoxy, mercapto, acyloxy, aryloxy, aralkyloxy and alkoxy.

9. The method according to claim 1, wherein the hardener component further comprises water.

10. The method according to claim 1, wherein the resin component further comprises a cement.

11. The method according to claim 1, wherein the fixing mortar comprises at least one silane chosen from 3-aminopropyl-trialkoxysilane, 3-glycidyloxypropyl-trialkoxysilane, bis(3-trialkoxysilylpropyl)amine, N-(alkyl)-3-aminopropyl-trialkoxysilane, 3-mercaptopropyl-trialkoxysilane, 3-(meth)acryloyl-oxypropyl-trialkoxysilane, alkenyl-trialkoxysilane, tetraalkoxysilane, alkoxy polysilicate and mixtures of two or more thereof.

12. The method according to claim 1, wherein the fixing mortar comprises at least one silane chosen from 3-(meth)acryloyloxypropyl-trimethoxysilane, 3-(meth)acryloyloxypropyl-triethoxysilane, 3-(meth)acryloyloxymethyl-trimethoxysilane, 3-(meth)acryloyloxymethyl-triethoxysilane, vinyltrimethoxysilane, vinyltriethoxysilane, tetraethoxysilane, tetramethoxysilane, tetrapropoxysilane, ethyl polysilicate, propyl polysilicate, and mixtures of two or more thereof.

13. The method according to claim 1, wherein the at least one resin component comprises at least one free-radical-hardening unsaturated reactive resin chosen from acrylic acid, methacrylic acid, mono-, di-, tri- and poly-(meth)acrylates and -methacrylates, epoxy(meth)acrylates, urethane- and urea-(meth)-acrylates and unsaturated polyester resins having an unsaturated carboxylic acid component, with or without the presence of reactive diluents.

14. The method according to claim 1, wherein the at least one resin component comprises a free-radical-hardening unsaturated reactive resin having the formula:

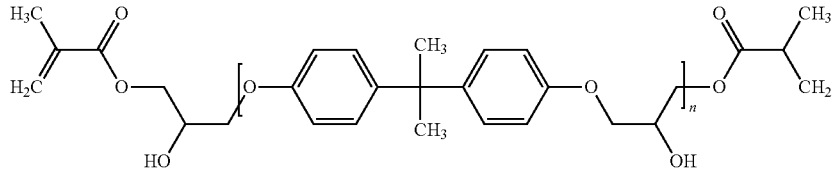

wherein n denotes a number greater than or equal to 1, but when mixtures of different molecules having different n values are present and are represented by the formula, non-integer numbers are also possible as a mean value; and/or
of formula

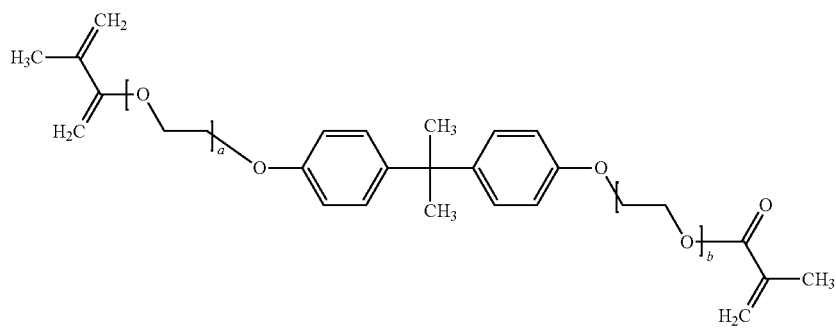

wherein a and b each independently of the other denote a number greater than or equal to 0, with non-integer numbers also being possible as a mean value when mixtures of different molecules having different a and b values are present and are represented by the formula; wherein there may be additionally included one or more reactive diluents selected from among mono-, di-, tri- and poly-(meth)acrylates; styrene, a-methyl styrene, vinyl toluene, tert-butyl styrene and divinyl benzene, and mixtures of two or more thereof, in a proportion by weight, based on the total amount by weight of the free-radical-hardening reactive resins, of from 0 to 90% by weight.

15. The method according to claim 14, wherein the reactive diluent is chosen from hydroxypropyl (meth)acrylate, acetacetoxyalkyl (meth)acrylate, (meth)acrylic acid methyl ester, 1,4-butanediol di(meth)acrylate, 1,2-ethanediol di(meth)acrylate, diethyl glycol di(meth)acrylate, trimethylolpropane tri(meth)acrylate, polyethylene glycol di(meth)acrylate, and combinations of two or more thereof.

16. The method according to claim 1, wherein the fixing mortar is a two-component system in the form of a two-chamber cartridge without or with a static mixer or a two-chamber capsule.

* * * * *